United States Patent
Winquist et al.

(10) Patent No.: US 10,637,885 B2
(45) Date of Patent: Apr. 28, 2020

(54) DOS DETECTION CONFIGURATION

(71) Applicant: Arbor Networks, Inc., Burlington, MA (US)

(72) Inventors: James E. Winquist, Ypsilanti, MI (US); William M. Northway, Jr., Ann Arbor, MI (US); Ronald G. Hay, Ann Arbor, MI (US); Nicholas Scott, Ann Arbor, MI (US); Lawrence B. Huston, III, Ann Arbor, MI (US)

(73) Assignee: Arbor Networks, Inc., Westford, MA (US)

( * ) Notice: Subject to any disclaimer, the term of this patent is extended or adjusted under 35 U.S.C. 154(b) by 42 days.

(21) Appl. No.: 15/362,250

(22) Filed: Nov. 28, 2016

(65) Prior Publication Data
US 2018/0152474 A1      May 31, 2018

(51) Int. Cl.
*H04L 29/06* (2006.01)
*H04L 12/26* (2006.01)
*H04L 12/24* (2006.01)

(52) U.S. Cl.
CPC ...... *H04L 63/1458* (2013.01); *H04L 41/0806* (2013.01); *H04L 43/04* (2013.01); *H04L 43/0882* (2013.01); *H04L 43/16* (2013.01); *H04L 63/1425* (2013.01); *H04L 43/08* (2013.01)

(58) Field of Classification Search
CPC . H04L 63/1458; H04L 43/04; H04L 43/0882; H04L 43/16; H04L 63/1325; H04L 41/0806; H04L 63/1425; H04L 43/08
See application file for complete search history.

(56) References Cited

U.S. PATENT DOCUMENTS

| | | | | |
|---|---|---|---|---|
| 7,788,718 B1* | 8/2010 | Fei | ...... | H04L 63/1458 726/14 |
| 8,042,180 B2* | 10/2011 | Gassoway | ...... | H04L 43/00 726/22 |
| 8,196,207 B2* | 6/2012 | Hill | ...... | G06Q 10/10 713/187 |
| 8,203,941 B2* | 6/2012 | Johnson | ...... | H04L 63/145 370/230 |
| 9,965,349 B2* | 5/2018 | Reese | ...... | H04L 43/08 |
| 2005/0111367 A1* | 5/2005 | Jonathan Chao | ... | H04L 63/1408 370/235 |
| 2005/0135266 A1* | 6/2005 | Horng | ...... | H04L 43/00 370/252 |

(Continued)

OTHER PUBLICATIONS

Mirkovic et al "Measuring Denial of Service," QoP '06, ACM, Oct. 30, 2006, pp. 53-58 (Year: 2006).*

*Primary Examiner* — Luu T Pham
*Assistant Examiner* — James J Wilcox
(74) *Attorney, Agent, or Firm* — Locke Lord LLP; Scott D. Wofsy; Christopher J. Capelli

(57) ABSTRACT

A method for configuring a network monitoring device is provided. One or more performance metrics associated with one or more thresholds to be configured are received from a user. Historical network traffic flow information associated with a previously detected malicious activity is analyzed to identify characteristic values for the one or more performance metrics. Threshold values are automatically configured based on the identified characteristic values.

3 Claims, 5 Drawing Sheets

(56) References Cited

U.S. PATENT DOCUMENTS

| | | | | |
|---|---|---|---|---|
| 2005/0235058 | A1* | 10/2005 | Rackus | H04L 41/046 709/224 |
| 2006/0075003 | A1* | 4/2006 | Adams | H04L 67/04 |
| 2007/0220002 | A1* | 9/2007 | Teodorescu | H04L 41/0893 |
| 2008/0040174 | A1* | 2/2008 | Murthy | G06Q 30/06 709/224 |
| 2009/0122697 | A1* | 5/2009 | Madhyasha | H04L 41/12 370/229 |
| 2009/0238088 | A1* | 9/2009 | Tan | H04L 41/0631 370/252 |
| 2011/0125748 | A1* | 5/2011 | Wood | H04L 43/026 707/737 |
| 2014/0143406 | A1* | 5/2014 | Malhotra | G06F 11/3409 709/224 |
| 2014/0380467 | A1* | 12/2014 | Winquist | H04L 63/1408 726/22 |
| 2015/0033084 | A1* | 1/2015 | Sasturkar | G06F 11/0709 714/46 |
| 2015/0033086 | A1* | 1/2015 | Sasturkar | G06F 11/0709 714/57 |
| 2015/0281008 | A1* | 10/2015 | Kumar | H04L 43/16 709/224 |
| 2016/0378583 | A1* | 12/2016 | Nakano | G06F 11/0709 714/37 |
| 2017/0318036 | A1* | 11/2017 | Movsisyan | H04L 63/1416 |

* cited by examiner

DOS DETECTION CONFIGURATION

FIELD OF THE INVENTION

Embodiments of the present invention relate generally to network security, and specifically to improved denial of service (DoS) detection configuration.

BACKGROUND OF THE INVENTION

Internet Service Providers (ISPs) face ever increasing operational challenges. For example, ISPs balance supporting bandwidth intensive applications (Internet Protocol Television (IPTV), voice over Internet Protocol (VoIP), etc.) while also mitigating and protecting against bandwidth intensive network security threats. Maintaining operations that support bandwidth-intensive applications during potential network attacks proves difficult, at best.

ISPs attempt to mitigate network-wide threats before impact of critical business services and applications. One example of one of these network-wide threats is bandwidth based attacks. For example, a Denial-of-Service (DoS) attack is a bandwidth based attack on a network system aimed at causing it to crash, i.e., to create conditions under which legitimate (rightful) system users cannot gain access to the resources (servers) provided by the system, or to make this access difficult. Taken further, a DoS attack that is carried out simultaneously on a larger number of computers is called a Distributed Denial-of-Service (DDoS) attack.

Like many other types of DoS attacks, the attacker can forge the source address of the flood packets without reducing the effectiveness of the attack. Because the source addresses of the attack packets are almost always forged, it is non-trivial to determine the true origin of such attacks. As a result, tracking down the source of a flood-type denial of service attack is usually difficult or impossible at least in a large, high-speed network. Furthermore, it is often difficult to determine whether to label a network event a DoS attack. It is highly desirable a user configuring an attack mitigation system learns what network events are considered normal for a plurality of different customers or logical entities sharing the network. Known DDoS detection devices typically require at least some configuration that would facilitate identification of a DDoS attack and determination of the attack magnitude. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a DDoS attack may involve multiple attackers sending malicious requests, making it more difficult to distinguish when an attack is underway. Configuration of DoS attacks detection logic is particularly challenging when network resources are limited and throughput is high.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for configuring a network monitoring device is provided. The method includes receiving from a user one or more performance metrics associated with one or more thresholds to be configured. Historical network traffic flow information associated with a previously detected malicious activity is analyzed to identify characteristic values for the one or more performance metrics. Threshold values are automatically configured based on the identified characteristic values.

In another aspect, a monitoring system includes a monitored network consisting of a plurality of devices. The monitoring system also includes a storage repository for storing historical network traffic flow information and one or more network monitoring devices communicatively coupled to the monitored network and to the storage repository. The monitoring device(s) are configured and operable to receive from a user one or more performance metrics associated with one or more thresholds to be configured. The monitoring device(s) are further configured and operable to analyze historical network traffic flow information associated with a previously detected malicious activity to identify characteristic values for the one or more performance metrics and to automatically configure threshold values based on the identified characteristic values.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
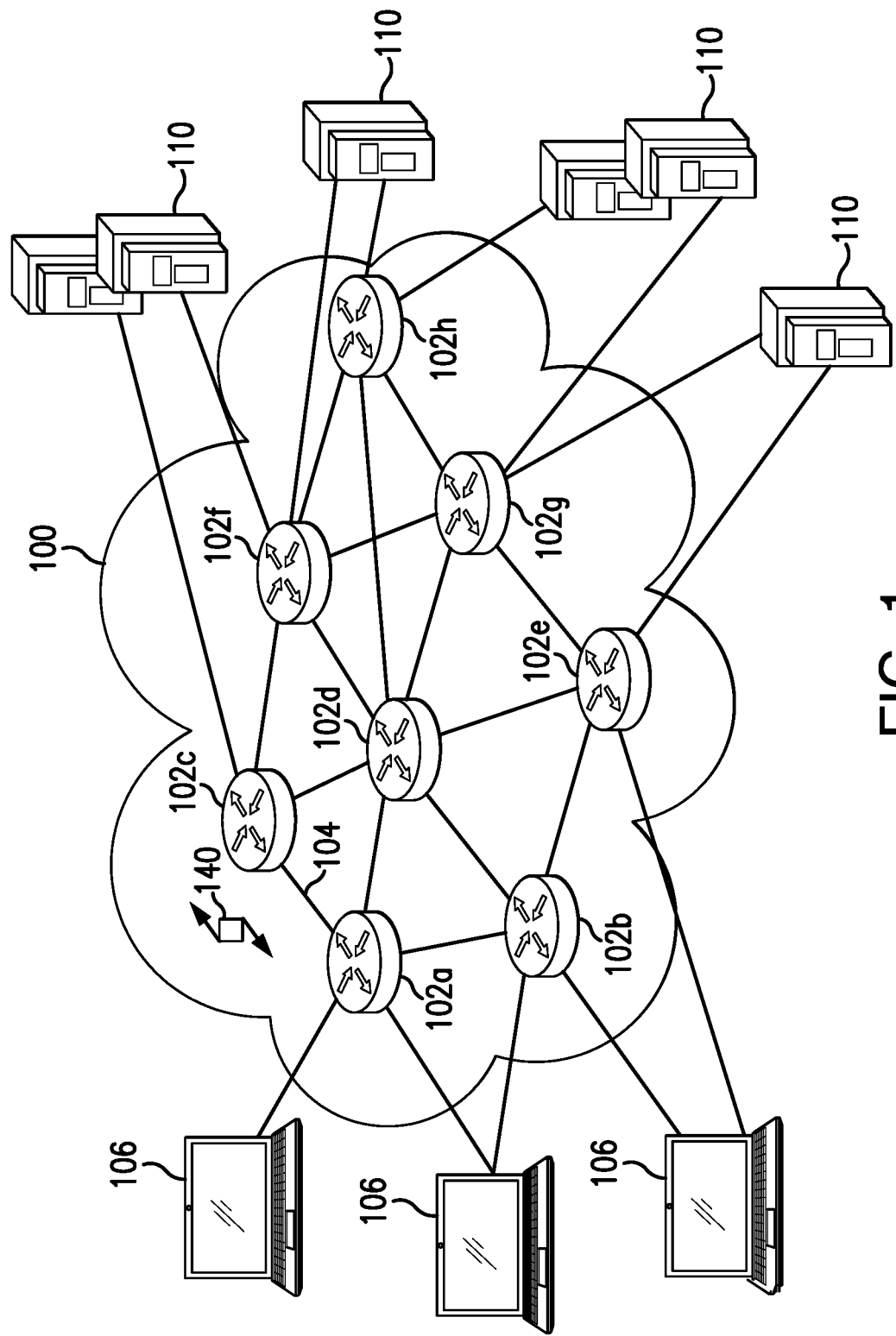
FIG. 1 illustrates a schematic block diagram of an example communication network illustratively comprising nodes/devices interconnected by various methods of communication.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

Upon detection, traffic anomalies can be processed to determine valuable network insights, including health of interfaces, devices and network services, as well as to provide timely alerts in the event of attack. Various embodiments of the present invention are further able to identify important network security problems, such as DoS and DDoS attacks in real time. Timely attack detection permits automatic or manual alerting of a mitigation system to such attack when the confidence level of attack detection is sufficient, as determined or predetermined by the operator. Most DDoS detection is performed by traffic analyzers which receive and analyze the incoming network traffic data in the streaming mode.

There are a defined number of sources, a defined number of destinations, and a defined number of protocols on a given network. Over a defined time interval, typically a period of 5 minutes, although other time frames often are used, both shorter and longer, a monitoring system monitors all connections between all pairs of hosts and destinations using any of the defined protocols. At the end of each interval, these statistics are summarized and reported to a network monitoring system. The network monitoring system determines if a particular parameter (variance or byte rate) exceeds a historical amount. In other words, the network monitoring system determines if a particular parameter (i.e., incoming packet count) is above a certain threshold, to filter out new or low-traffic hosts that suddenly receive a low but still larger than normal amount of traffic. A typical DDoS alert will be generated when the parameter exceeds such threshold (over a defined time interval). Various embodiments of the present invention automate the threshold settings which would otherwise be set through manual tuning, possibly with a lot of trial and error.

Various embodiments of the present invention can be used to facilitate the automation of threshold settings for flow monitoring solutions by utilizing a large database of historical network traffic flow data. The embodiments of the invention also demonstrate that there can be a reasonably low overhead for this automated approach.

In general, according to one aspect, embodiments of the present invention feature a method for configuring a network monitoring device. The method comprises utilizing historical data to derive various threshold values.

Turning now descriptively to the drawings, in which similar reference characters denote similar elements throughout the several views, FIG. 1 is a schematic block diagram of an example communication network 100 illustratively comprising nodes/devices 102a-h interconnected by various methods of communication or links 104. For instance, the links 104 may be wired links or may comprise a wireless communication medium, where certain nodes 102a-h, such as, e.g., routers, switches, sensors, computers, network devices, etc., may be in communication with other nodes 102a-h, e.g., based on distance, signal strength, current operational status, location, etc. Operatively, a client device 106 communicates data to/from servers or data centers 110 via network 100. In this fashion, client devices 106 can access data from particular servers/data centers 110. Those skilled in the art will understand that any number of nodes, devices, links, etc. may be used in the computer network, and that the view shown herein is for simplicity. Also, while the embodiments are shown herein illustrate particular connections between nodes, the description herein is not so limited, and various types of networks can be used, as is understood by those skilled in the art.

Figure 2:
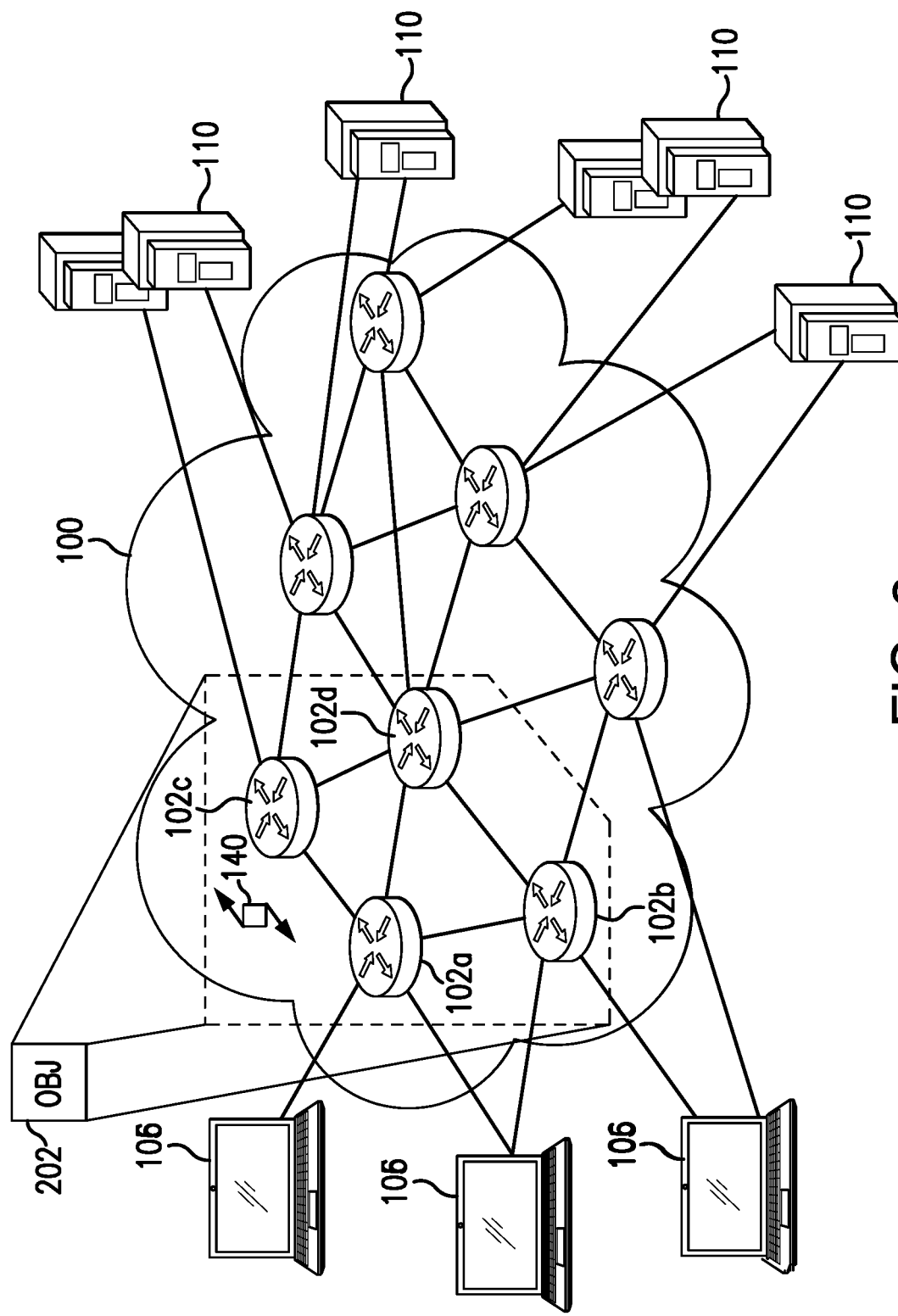
FIG. 2 illustrates various nodes in the communication network grouped into a single managed object.

FIG. 2 illustrates various nodes in the communication network 100 grouped into a single managed data object 202. In particular, one or more nodes 102a-d are grouped according to a data capacity into the single managed group object 202. Such grouping facilitates forced alert process 314 and automated threshold configuration process 316, as discussed herein. Notably, the nodes 102 of the single managed data object 202 can be grouped, for example, according to similar network interfaces. That is, each of the grouped nodes can include the same network interfaces such as data ports, processing capacity, etc. While FIG. 2 shows an illustrative embodiment, it is to be understood that various other adaptations and modifications may be made within the spirit and scope of the embodiments herein. For example, the embodiments have been shown and described herein with relation to particular nodes grouped in a managed object, however even a single node having multiple network interfaces can be grouped in its own managed object.

Figure 3:
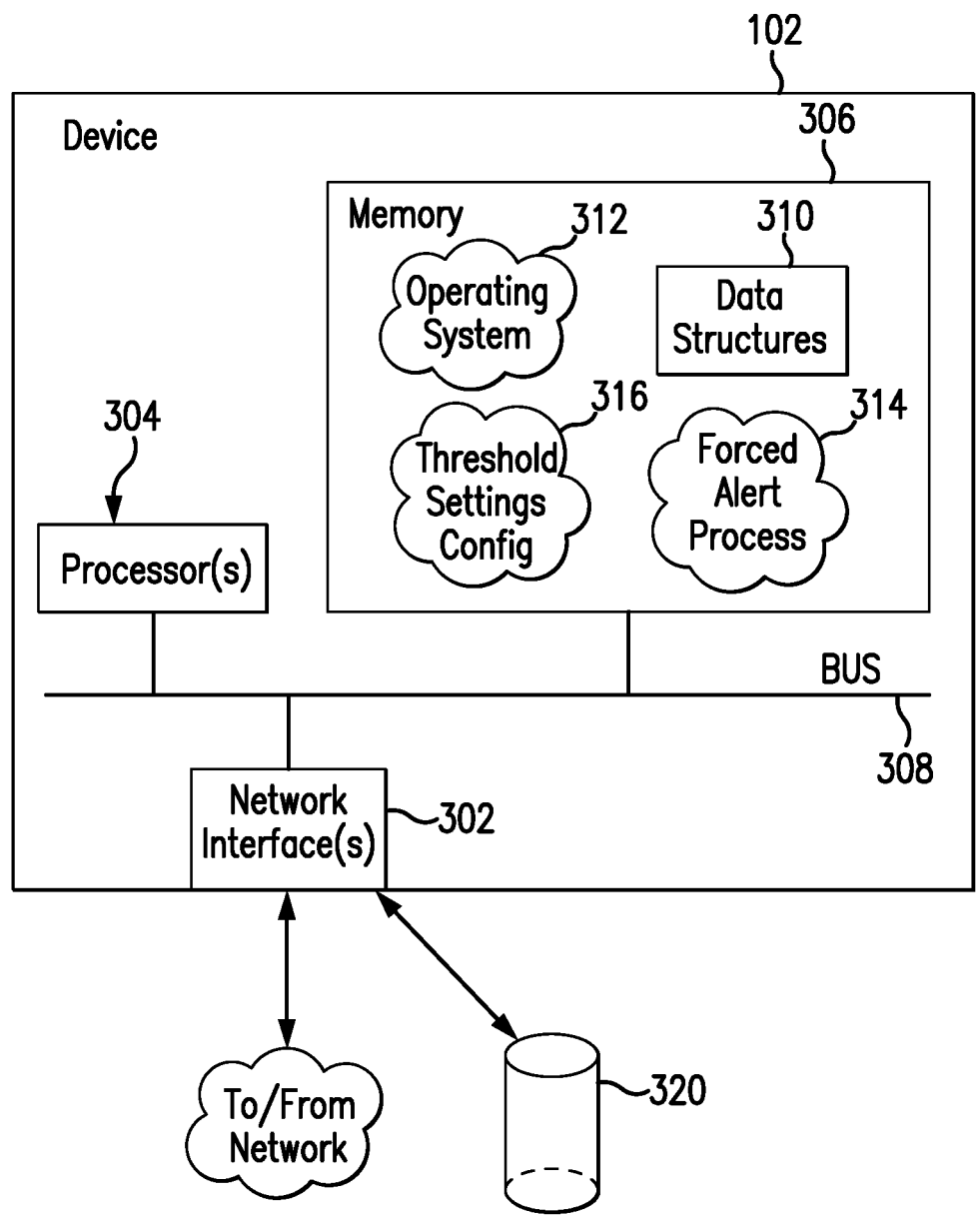
FIG. 3 illustrates a schematic block diagram of an example network monitoring node/device that may be used for configuring various threshold settings in the communication network of FIGS. 1 and 2.

FIG. 3 is a schematic block diagram of an example network monitoring node/device 102a that may be used with one or more embodiments described herein, e.g., as one of the nodes in the communication network 100. The configuration device may comprise one or more network interfaces 302, at least one processor 304, and a memory 306 interconnected by a system bus 308.

The network interface(s) 302 contain the mechanical, electrical, and signaling circuitry for communicating data over physical and/or wireless links coupled to the network 100. The network interfaces may be configured to transmit and/or receive data using a variety of different communication protocols, including, inter alia, TCP/IP, UDP, wireless protocols (e.g., IEEE Std. 802.15.4, WiFi, Bluetooth®), Ethernet, powerline communication (PLC) protocols, etc.

The memory 306 comprises a plurality of storage locations that are addressable by the processor 304 and the network interfaces 302 for storing software programs and data structures associated with the embodiments described herein. As noted above, certain devices may have limited memory or no memory (e.g., no memory for storage other than for programs/processes operating on the device). The processor 304 may comprise necessary elements or logic adapted to execute the software programs and manipulate data structures 310, such as routes or prefixes (notably on capable devices only). An operating system 312, portions of which are typically resident in memory 306 and executed by the processor, functionally organizes the device by, inter alia, invoking operations in support of software processes and/or services executing on the device. These software processes and/or services may comprise forced alert process/services 314 and threshold configuration process/services 316.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Illustratively, the techniques described herein may be performed by hardware, software, and/or firmware, such as in accordance with the threshold setting configuration 316, which may contain computer executable instructions executed by the processor 304 (or an independent processor of network interfaces 302) to perform functions relating to the techniques described herein.

As noted above, ISPs attempt to mitigate network-wide threats before impact of critical business services and applications. One example of one of these network-wide threats is bandwidth based DoS attacks. Since network routers, servers and firewalls have limited processing resources, they may become inaccessible for processing legitimate transactions or crash under the overload during DoS and DDoS bandwidth attacks, in which a large number of TCP, UDP or ICMP packets are sent to a specific network device or service. For example, referring again to FIG. 1, one or more client devices 106 can flood the nodes 102 of network 100 with repetitive data requests, which may cause such nodes and/or data centers/servers handling such requests to crash due to a bandwidth overload.

Attempts to mitigate and protect against network threats can include establishing a baseline profile for one or more conditions of a network (e.g., a particular data rate), detecting network behavior aberrant from the baseline profile, and performing threat mitigation techniques such as quarantining particular network resources, re-routing certain traffic/data, etc. Typically, baseline profiles are dynamic in nature and adjusted constantly (and automatically) over time as network conditions change. However, such dynamic profiles are susceptible to certain evasive network threats. For example, a network attack can slowly increase traffic or data rates over time so as to incrementally adjust a corresponding baseline profile thus avoiding detection.

In one or more embodiments of the invention, the network monitoring node 102a is configured to store received data in a storage repository 320. Such network data captured over a time period (e.g., an hour, a day, a week, etc.) is referred to as trace or network trace. Network trace contains data units (e.g., IP addresses, flows, domain names, etc.) related to communications between nodes in the computer network 100. Further, the network trace may be associated with only time period in the past and is referred to as historical network data. Alternatively, the network trace may be updated continuously from a starting time point and is referred to as real-time network data. For example, the real-time network data may have a fixed static starting time point or may encompass a fixed time interval with a dynamically changing starting time point. For example, the network trace may be captured on a routine basis using one or more data collectors and selectively sent to the network interface 302 from time to time to be formatted and stored in the repository 320 for analysis. The data collectors may comprise, for example, a packet analyzer, network analyzer, protocol analyzer, sniffer, netflow device, semantic traffic analyzer (STA), or other types of data collection device that intercept and log data traffic passing over the computer network 100 or a portion thereof. In one or more embodiments, the data collectors may be deployed in the computer network 100 by a network communication service provider (e.g., ISP), a network security service provider, or other business or government entities. The data collector may be configured to capture and provide network trace to the network monitoring node 102a through an automated process, such as through a direct feed or some other form of automated process. Such network data may be captured and provided on a periodic basis (e.g., hourly, daily, weekly, etc.) or based on a trigger. For example, the trigger may be activated automatically in response to an event in the computer network 100 or activated manually through the client device 106.

Figure 4:
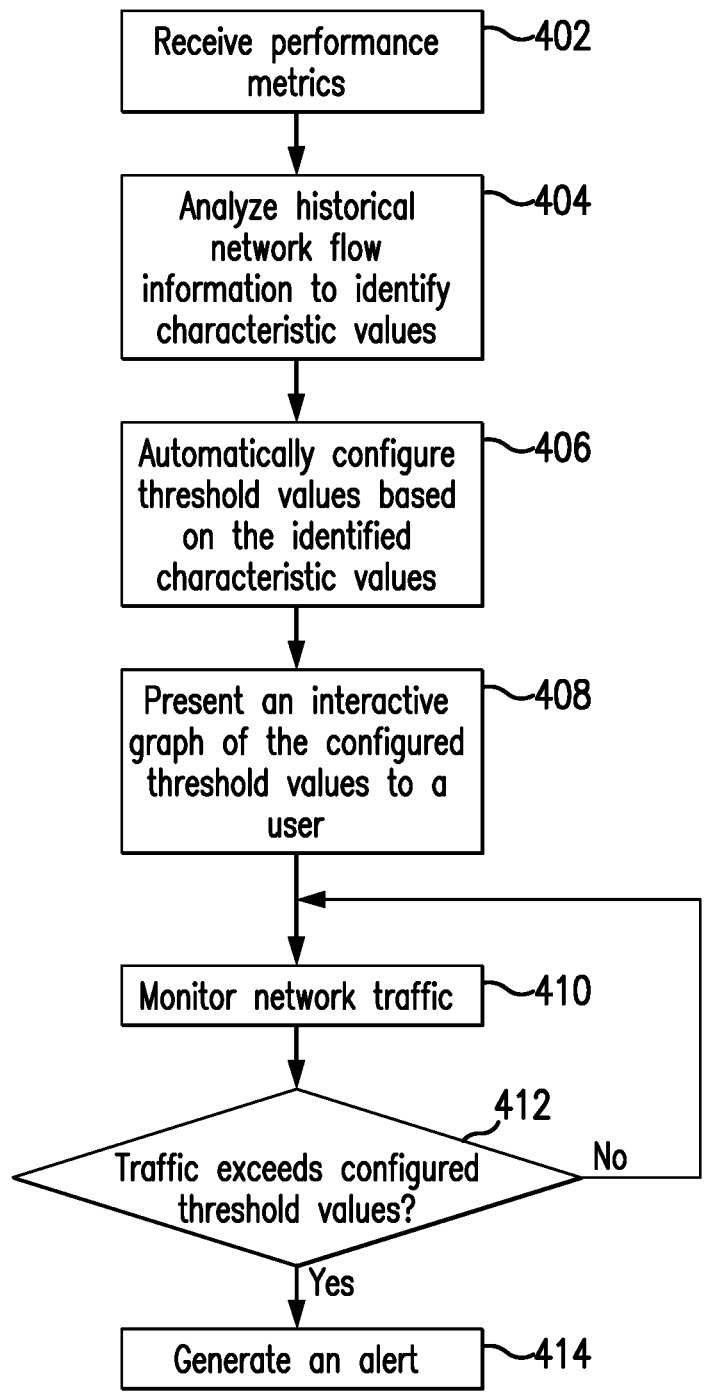
FIG. 4 is a flowchart showing the operation of the network monitoring device of FIG. 3, according to one or more embodiments discussed herein.

FIG. 4 is a flowchart showing the operation of the threshold setting configuration 316 and of the exemplary monitoring node/device 102, according to an embodiment of the present invention. Before turning to description of FIG. 4, it is noted that the flow diagram in FIG. 4 shows examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

In step 402, threshold configuration process 316 preferably receives user's input specifying a desirable monitoring type (i.e., monitoring entire network, monitoring specific managed object and the like). In one non-limiting embodiment user's input may be received via an alert configuration screen displayed by a Graphical User Interface (GUI) of the network monitoring device 102a, for example. The alert configuration screen may enable users to specify performance metrics and/or alert conditions associated with one or more thresholds they are interested in. In one simplified example, the alerts configuration screen may include following performance metrics to select from: maximum data rate in bps (bits per second) and/or pps (packets per second)

on a router, maximum transmission rate (in bps or pps) of an interface link, maximum throughput rate (in bps or pps) through a managed object, maximum transmission rate of individual TCP connections (SYN packets) through a managed object, UDP traffic conditions through a managed object, and the like.

In step 404, threshold configuration process 316 analyzes historical network flow information classified as associated with a previously detected malicious activity to identify characteristic values for the specified performance metrics. As noted above, this historical network flow information may be stored in the storage repository 320. The storage repository 320 may be implemented by any conventional or other type of database or storage unit, may be local to or remote from network monitoring node/device 102a, and may communicate via any appropriate communication medium (e.g., local area network (LAN), wide area network (WAN), Internet, hardwire, wireless link, Intranet, etc.). Also, the repository 320 may be implemented as a mix of data structures, objects, and relational structures. Portions of repository 320, e.g., tables, may be exported and/or imported and thus decentralized and/or integrated.

Furthermore, according to an embodiment of the present invention, in step 404, the threshold configuration process 316 can scan the historical network flow information in reverse from the end time of a predetermined period towards the beginning time of the predetermined period. The threshold configuration process 316, for each managed object, evaluates performance metrics associated with each threshold and derives an appropriate characteristic threshold value based on the scanned data.

In one embodiment, step 404 may involve the threshold configuration process 316 analyzing a plurality of historical network events that convey the state of one or more network managed objects (such as managed object 202 shown in FIG. 2). Such historical network events may include exceptional conditions occurring in the operation of the network 100. In one embodiment, events that convey the state of managed objects can include performance metrics indicative of significant events selected from the group consisting of hardware/software failures, performance bottlenecks, configuration problems, and/or security violations associated with a monitored managed object. It should be noted that certain performance metrics may need to be discarded from the analysis performed by the threshold configuration process 316 if there is a high probability that these performance metrics are associated with previously occurring DDoS attack traffic. Accordingly, in one embodiment, the threshold configuration process 316 performs historical network data analysis over a fixed time interval. In other words, fixed time intervals may be useful for normalized comparisons of performance metrics and for ruling out the excessive values of these performance metrics.

In alternative embodiments, the threshold configuration process 316 may use a variety of statistical techniques to identify the outliers and remove them from the consideration. Outlier removal is a well-known technique of statistics. An "outlier" is an observation that is distant from the rest of a set of statistical data collected, that is an outlying observation, or outlier, is one that appears to deviate markedly from the rest of a statistical sample. In various embodiments these statistical techniques may include K-nearest neighbors, t-value tests, and the like. An estimation method, such as the k-nearest neighbors (KNN) estimation of differential entropy may be modified to be used to estimate Kullback Leibler (KL) divergence. A sliding window may be applied to the historical data, and each time point may be chosen to be a reference. KNN estimation of KL divergence may avoid multidimensional distribution estimation.

Referring back to FIG. 4, in step 406, the threshold configuration process 316 generates individual thresholds settings for the particular managed object(s) which is being monitored based on the values derived in step 404. In some embodiments, step 406 may further involve storing the generated individual threshold settings (e.g., in the storage repository 320) so that later analysis sessions for this managed object provide more accurate configuration settings. In other words, the threshold configuration process 316 may evaluate derived configuration settings over time. In cases where automatically configured settings are diagnosed by the threshold configuration process 316 to perform poorly a user input may be required. The user input may for example be a simple click on a button indicating that the current (automatically generated) threshold configurations are regarded to belong to an excellent (e.g., more than satisfactory) detection performance. If this button is not pressed, then no adjustment of threshold values is required by the user. Alternatively, the user may differentiate the detection performance, for example by stating expressly whether the automatically generated configuration settings are regarded to be excellent, good (e.g., satisfactory), fair or poor (e.g., less than satisfactory).

According to one embodiment of the present invention, to obtain user input, the threshold configuration process 316 may present visual information to a user to convey the effect of the automatically configured values. The presented information may be interactive such that a user may make selections, provide inputs, and/or manipulate automatically configured threshold settings.

Figure 5:
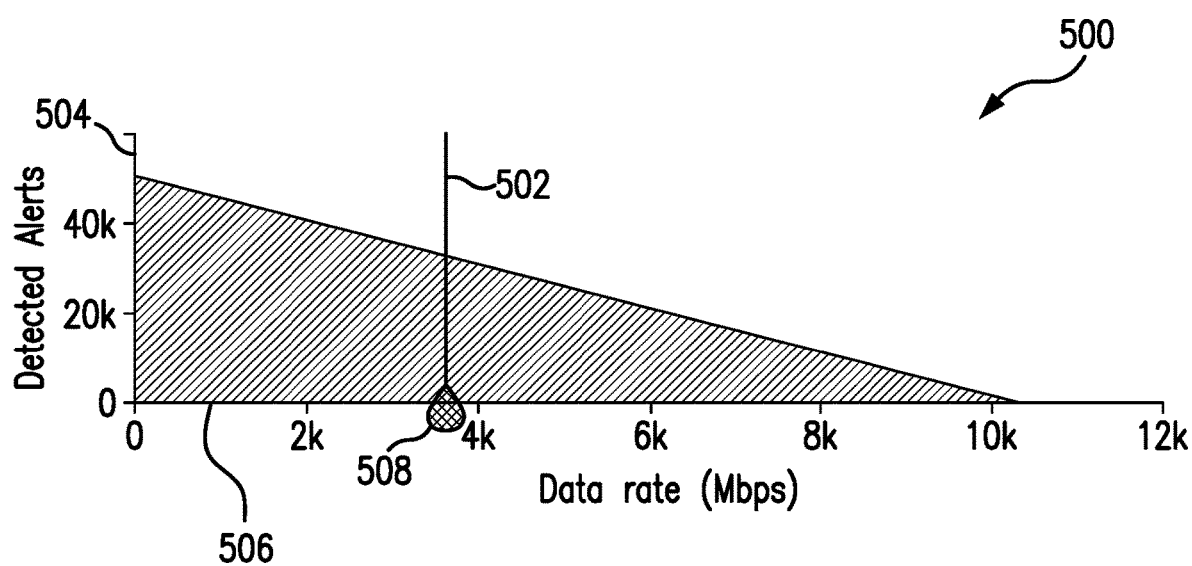
FIG. 5 illustrates exemplary interactive visual information presented to a user to convey the effect of the automatically configured values, in accordance with some embodiments of the present invention.

FIG. 5 illustrates exemplary visual information in the form of an interactive graph 500. The Y-axis 504 of the graph 500 represents the number of alerts, which are triggered once the automatically configured threshold value 502 is exceeded by the data rate represented by the X-axis 506. Notably, the threshold 502 can be set by the threshold configuration process 316 for the single managed group such that each network interface of each node is configured with its own alert. That is, graph 500 illustratively shows a data rate threshold 502 with respect to corresponding number of detected alert(s) 504 for a particular network interface of a single managed object (i.e., the managed object 202 shown in FIG. 2). As noted above, the graph 500 is interactive allowing a user to manipulate the automatically configured threshold value 502 by using a slider 508 or any other suitable graphical interface element. It should be understood that similar interactive graphs may be presented by the threshold configuration process 316 for a plurality of other thresholds discussed above. Advantageously, the interactive graph 500 enables users to adjust threshold settings based on their knowledge of the network.

Additionally or alternatively, in this or other embodiments the threshold configuration process 316 may convey the effect of the automatically configured values. For example, using the analysis of historical network flow information performed in step 404 the threshold configuration process 316 enables a user to see what previous historical incidents could be classified as DDoS alerts if alerts detection settings were tuned in a particular way.

In yet another embodiment of the present invention, the threshold configuration process 316 may determine the health of services running in the network 100 by utilizing additional metrics provided by a user as inputs into the analysis process performed in step 404. For example, the threshold configuration process 316 could measure the health of services by monitoring the rate of online sales. In other words, the threshold configuration process 316 may be configured to calculate the rate of sales to detect one or more anomalies in the data flow and may be configured to correlate this additional metric with the historical data flow in step 404 to identify and stop network and application-level attacks before they inflict any damage by providing automatic detection configuration capabilities that result in more accurate and timely detection of an attack.

Once the threshold configuration process 316 establishes threshold values, in step 410, the forced alert process 314 monitors performance metrics and/or alert conditions associated with one or more thresholds users are interested in. For example, the forced alert process 314 may monitor current rate of received real-time data at each node (e.g., at each interface) of the single managed object (e.g., a bps, a pps, etc.). In step 412, the forced alert process 314 compares the current rate of the received data (or any other metric of interest) at each node of the single managed object to at least one of the one or more automatically configured thresholds. Next, in step 414, the forced alert process 314 triggers at least one alert for each node (e.g., for each network interface) of the single managed object when the current rate of the received data at a particular node exceeds the one or more automatically configured thresholds (decision block 412, "Yes" branch). A severity can optionally be assigned to each alert by the forced alert process 314 when the at least one alert is triggered.

In summary, various embodiments of the present invention disclose a novel approach to configure network monitoring and attack detection systems capable of analyzing a large amount of historical data which allows this hindsight to be combined with compiled configuration modification history to get an alternate view of historical attacks. The disclosed approach provides a number of advantages. One benefit of the above-described approach is that the aforementioned system is capable of providing diagnostic and configuration information related to computer network performance that can replace labor intensive, slow and error prone manual configuration approach. Various software solutions contemplated by various embodiments of the present invention allow adaptation to make use of the metrics relevant to the monitored system. This near-real-time system specific information can be used by users to learn about the optimal threshold settings for the detection system using data that is more familiar to them.

Most preferably, the various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A network monitoring device comprising:
a memory configured to store instructions;
one or more processors disposed in communication with the memory and communicatively coupled to a plurality of network nodal devices, wherein the one or more processors upon execution of the instructions is configured to:
  receive from a user one or more performance metrics associated with one or more thresholds to be configured;
  receive from a user designation of a subgroup of nodal devices from the plurality of network nodal devices consisting of at least two nodal devices (single managed data object devices);
  analyze, by the one or more processors, historical network traffic flow information associated with a previously detected malicious activity regarding the single managed data object devices in reverse from the end time of a predetermined period towards a beginning time of the predetermined time period to identify characteristic values for the one or more performance metrics for the single managed data object devices, wherein the performance metrics include one or more of: maximum data rate in bps (bits per second) and pps (packets per second) on a router, maximum transmission rate of an interface link, maximum throughput rate through a managed object, maximum transmission rate of individual TCP connections (SYN packets) through a managed object and UDP traffic conditions through a managed object;

automatically configure, by the one or more processors, threshold values based on the identified characteristic values;

store the configured threshold values in a data repository;

evaluate the configured threshold values stored in the data repository based upon user input regarding performance metrics over time associated with the configured threshold settings;

present to the user via a user interface, by the one or more processors, interactive visual information in a user interactive graph provided on the user interface displaying the effect of the automatically configured threshold values using the historical network traffic flow information for the single managed data object devices;

monitor, by the one or more processors, network traffic for the single managed data object devices to determine when the network traffic exceeds the automatically configured threshold values; and generate, by the one or more processors, an alert responsive to the determination that the network traffic for the single managed data object devices exceeds one or more of the configured threshold values.

2. The network monitoring device as recited in claim 1, wherein analyzing historical network traffic flow information comprises discarding, by the one or more processors, a portion of the historical network traffic flow information.

3. The network monitoring device as recited in claim 1, wherein the historical network traffic flow information is stored in a storage repository.

\* \* \* \* \*